United States Patent [19]

Wariishi et al.

[11] Patent Number: 5,556,985

[45] Date of Patent: Sep. 17, 1996

[54] PYRAZOLONOXONOL COMPOUNDS

[75] Inventors: Koji Wariishi; Mario Aoki, both of Kanagawa, Japan

[73] Assignee: Fuji Photo Film Co., Ltd., Kanagawa, Japan

[21] Appl. No.: 379,209

[22] Filed: Jan. 27, 1995

[30] Foreign Application Priority Data

Jan. 31, 1994 [JP] Japan .................................. 6-009827

[51] Int. Cl.⁶ ............................................... C07D 231/20
[52] U.S. Cl. .......................................... 548/365.4; 544/82
[58] Field of Search ........................................ 548/365.4

[56] References Cited

U.S. PATENT DOCUMENTS 2,274,782  3/1942  Gaspar .
2,439,098  4/1948  Porter et al. .

FOREIGN PATENT DOCUMENTS 0476928   3/1992   European Pat. Off. .
2290693   11/1975  France .
51-77327  7/1976   Japan .
3-288841  12/1991  Japan .
4-130429  5/1992   Japan .
2014598   8/1979   United Kingdom .

Primary Examiner—Robert W. Ramsuer
Attorney, Agent, or Firm—Sughrue, Mion, Zinn, Macpeak & Seas

[57] ABSTRACT

A novel pyrazolonoxonol compound represented by formula (A) and a silver halide photographic material comprising such a pyrazolonoxonol compound:

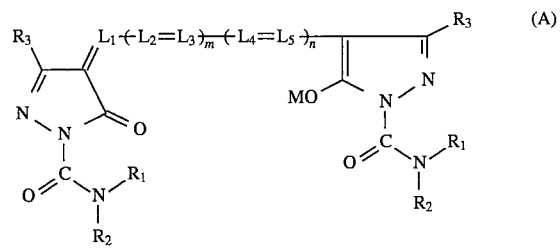

wherein $R_1$ and $R_2$ each represents a hydrogen atom, an alkyl group or an aryl group, and the alkyl groups represented by $R_1$ and $R_2$ may bond each other to form a saturated 5- or 6-membered ring; $R_3$ represents a hydrogen atom, an alkyl group, an aryl group, a heterocyclic group, a hydroxyl group, an alkoxy group, a carboxyl group, an ester group, a carbamoyl group, an amino group, an acylamino group, an ureide group, an urethane group or a cyano group; $L_1$, $L_2$, $L_3$, $L_4$ and $L_5$ each represents a methine group, and the methine groups which are not adjacent to each other may bond each other to form a 5- or 6-membered ring; M represents a hydrogen atom or a monovalent cation; and m and n each represent an integer 0 or 1.

7 Claims, No Drawings

PYRAZOLONOXONOL COMPOUNDS

FIELD OF THE INVENTION

The present invention relates to a pyrazolonoxonol compound represented by formula (A) useful as a dye or the like. More particularly, the present invention relates to a silver halide photographic material comprising such a compound represented by formula (A).

BACKGROUND OF THE INVENTION

Many pyrazolonoxonols having a hydrogen atom, an alkyl group, an aryl group or a heterocyclic group in the 1-position have been known. However, no pyrazolonoxonol compounds having a carbamoyl group have been known.

On the other hand, it has been a common practice in the field of silver halide photographic material to color hydrophilic colloidal layers in order to adjust the spectral sensitivity thereof or inhibit irradiation or halation thereof. It goes without saying that dyes with which the hydrophilic colloidal layers are colored should have no adverse effects on photographic properties, e.g., fog. These dyes also need to be rapidly decolored upon development. It is further preferred that these dyes can undergo full decomposition in the processing solution so that they have no adverse effects on the processing solution, e.g., coloring.

Examples of dyes which have been found to meet the foregoing requirements include pyrazolonoxonol dyes as disclosed in U.S. Pat. No. 2,274,782, and JP-A-51-77327 (The term "JP-A" as used herein means an "unexamined published Japanese patent application"), JP-A-3-288841, and JP-A-4-130429.

However, these pyrazolonoxonol dyes are disadvantageous in that they exhibit an insufficient stability in gelatin layers, causing a reduction in the color density during storage.

SUMMARY OF THE INVENTION

It is therefore an object of the present invention to provide a novel pyrazolonoxonol compound useful as a dye or the like. It is another object of the present invention to provide a silver halide photographic material having an excellent preservability.

The foregoing objects of the present invention are accomplished with the following (i) to (iv):

(i) A pyrazolonoxonol compound represented by formula (A)

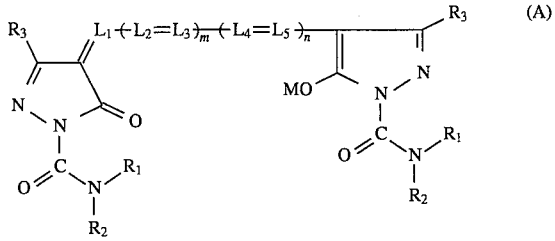

wherein $R_1$ and $R_2$ each represent a hydrogen atom, an alkyl group or an aryl group, the alkyl groups represented by $R_1$ and $R_2$, which may be substituted, may bond each other to form a saturated 5- or 6-membered ring; $R_3$ represents a hydrogen atom, an alkyl group, an aryl group, a heterocyclic group, a hydroxyl group, an alkoxy group, a carboxyl group, an ester group, a carbamoyl group, an amino group, an acylamino group, an ureide group, an urethane group or a cyano group; $L_1$, $L_2$, $L_3$, $L_4$ and $L_5$ each represent a methine group, and the methine groups which are not adjacent to each other may bond to form a 5- or 6membered ring; M represents a hydrogen atom or a monovalent cation; and m and n each represents an integer 0 or 1.

(ii) A silver halide photographic material comprising a pyrazolonoxonol compound represented by formula (A) as defined in (i).

(iii) A silver halide photographic material comprising a molecularly dispersed pyrazolonoxonol compound represented by formula (A) as defined in (i).

(iv) A silver halide photographic material comprising a solid-dispersed pyrazolonoxonol compound represented by formula (A) as defined in (i).

The terms "molecular dispersion" and "solid dispersion" as used herein are meant to indicate that the foregoing compound is molecularly dispersed and solid-dispersed, respectively.

DETAILED DESCRIPTION OF THE INVENTION

The alkyl group represented by $R_1$ or $R_2$ is preferably a $C_{1-10}$ straight-chain, branched or cyclic alkyl group such as methyl, ethyl, n-propyl, n-butyl, sec-butyl, t-butyl, isobutyl, n-pentyl, n-hexyl, cyclohexyl, 2-ethylhexyl and cyclopentyl. The alkyl group may be substituted by substituents such as a $C_{1-8}$ alkoxy group (e.g., methoxy, ethoxy), a $C_{1-8}$ alkylthio group (e.g., methylthio, ethylthio), a carboxyl group, a $C_{2-8}$ ester group (e.g., methoxycarbonyl, ethoxycarbonyl), a $C_{1-8}$ carbamoyl group (e.g., unsubstituted carbamoyl, dimethylcarbamoyl, diethylcarbamoyl), a sulfo group, a hydroxyl group and a substituted amino group (e.g., dimethylamino).

The aryl group represented by $R_1$ or $R_2$ is preferably a phenyl group. The aryl group may be substituted by substituents. Examples of these substituents include those enumerated above in the alkyl group represented by $R_1$ or $R_2$, a $C_{1-4}$ alkyl group (e.g., methyl, ethyl, t-butyl, n-propyl), a halogen atom (e.g., F, Cl , Br), and a cyano group.

The alkyl groups represented by $R_1$ and $R_2$ may be connected to each other to form a saturated 5- or 6-membered ring. Examples of the ring thus formed include a morpholine ring, a piperidine ring, and a pyrrolidine ring.

The alkyl group represented by $R_3$ is preferably a $C_{1-10}$ straight-chain, branched or cyclic alkyl group such as methyl, ethyl, n-propyl, n-butyl, sec-butyl, t-butyl, isobutyl, n-pentyl, n-hexyl, cyclohexyl, 2-ethylhexyl and cyclopentyl. The alkyl group may be substituted by substituents such as a $C_{1-8}$ alkoxy group (e.g., methoxy, ethoxy), a $C_{1-8}$ alkylthio group (e.g., methylthio, ethylthio), a carboxyl group, a $C_{2-8}$ ester group (e.g., methoxycarbonyl, ethoxycarbonyl), a $C_{1-8}$ carbamoyl group (e.g., unsubstituted carbamoyl, dimethylcarbamoyl, diethylcarbamoyl), a sulfo group, a hydroxyl group and a substituted amino group (e.g., dimethylamino).

The aryl group represented by $R_3$ is preferably a phenyl group. The aryl group may be substituted by substituents. Examples of these substituents include those enumerated in the aryl group represented by $R_1$ or $R_2$, a $C_{1-8}$ alkylsulfonyl group (e.g., methanesulfonyl), a $C_{2-8}$ carbonamide group (e.g., acetylamino, propionylamino), a $C_{2-8}$ acyl group (e.g., acetyl, propionyl), a $C_{2-8}$ urethane group (e.g., methoxycarbonylamino, n-butoxycarbonylamino), a $C_{1-8}$ ureide group (e.g., methylcarbamoylamino, phenylcarbamoylamino), and a $C_{0-8}$ sulfamoyl group (e.g., methylsulfamoyl, ethylsulfamoyl).

The heterocyclic group represented by $R_3$ is a 5- or 6-membered heterocyclic group containing at least one of an oxygen atom, a nitrogen atom and a sulfur atom as a hetero atom. Examples of these heterocyclic groups include pyridyl, imidazolyl, furyl, thienyl, pyrrolyl, and morpholino. Particularly preferred among these heterocyclic groups are nitrogen-containing heterocyclic groups.

Examples of the alkoxy group represented by $R_3$ include a $C_{1-2}$ alkoxy group (e.g., methoxy, ethoxy).

The ester group represented by $R_3$ is preferably a group containing a saturated alkoxy group having not more than 7 carbon atoms such as ethoxycarbonyl and isopropoxycarbonyl.

The carbamoyl group represented by $R_3$ may be a carbamoyl group derived from either a primary amine such as ammonia and methylamine or a secondary amine such as morpholine and diethylamine. At least one of substituents on carbamoyl group derived from secondary amine is preferably an alkyl group having 1 to 8 carbon atoms.

If the amino group represented by $R_3$ contains substituents, these substituents are preferably alkyl groups having 1 to 8 carbon atoms.

The acyl group in the acylamino group represented by $R_3$ is preferably a group having not more than 8 carbon atoms such as acetyl and benzoyl.

Examples of the ureide group represented by $R_3$ include a $C_{1-8}$ ureide group (e.g., unsubstituted ureide, methylcarbamoylamino, ethylcarbamoylamino, n-propylcarbamoylamino n-butylcarbamoylamino, phenylcarbamoylamino).

The urethane group represented by $R_3$ is preferably an urethane group containing an alkyl group, such as methoxycarbonylamino and n-butoxycarbonylamino.

Preferably, $R_1$ and $R_2$ each represents a hydrogen atom, an alkyl group having 1 to 4 carbon atoms or a phenyl group, more preferably a hydrogen atom.

Preferably, $R_3$ represents an alkyl group having 1 to 4 carbon atoms, a phenyl group, an alkoxy group having 1 or 2 carbon atoms, a carboxyl group, an ester group having 2 or 3 carbon atoms, an amino group, an acylamino group having 2 or 3 carbon atoms, an ureide group having 1 to 5 carbon atoms or an urethane group having 2 to 5 carbon atoms.

Preferably, $L_1$, $L_2$, $L_3$, $L_4$ and $L_5$ each represents an unsubstituted methine group or a methine group substituted by an alkyl group having 1 to 3 carbon atoms.

As a preferred combination, $R_3$ is an alkyl group having not more than 4 carbon atoms, a substituted or unsubstituted phenyl group, an alkoxy group having not more than 2 carbon atoms, a carboxyl group, an ester group having not more than 3 carbon atoms, an amino group, an acylamino group having not more than 6 carbon atoms, an ureide group having not more than 5 carbon atoms or an urethane group having not more than 5 carbon atoms, and $R_1$ and $R_2$ each is a hydrogen atom, an alkyl group having not more than 4 carbon atoms or a substituted or unsubstituted phenyl group. In a particularly preferred combination, $R_3$ is an alkyl group having not more than 4 carbon atoms, an unsubstituted phenyl group, an ethoxy group, a carboxyl group, an ethoxycarbonyl group, an amino group, an acylamino group having not more than 4 carbon atoms, an ureide group having not more than 5 carbon atoms or an urethane group having not more than 5 carbon atoms, and $R_1$ and $R_2$ each is a hydrogen atom, an alkyl group having not more than 4 carbon atoms or an unsubstituted phenyl group.

The methine group represented by $L_1$, $L_2$, $L_3$, $L_4$ or $L_5$ may be unsubstituted or substituted by substituents such as methyl, ethyl, benzyl, phenyl, chlorine, amino, piperidino, morpholino and hydroxyl. Preferred examples of these substituents include an alkyl group having not more than 3 carbon atoms. The methine groups represented by $L_1$, $L_2$, $L_3$, $L_4$ and $L_5$, which are not adjacent to each other, may be connected to each other to form a 5- or 6-membered ring such as cyclopentene ring, cyclohexene ring, 1-chlorocyclohexene ring, 1-dimethylaminocyclopentene ring and 1-morpholinocyclopentene ring. Examples of the pyrazoloxonol compound represented by formula (A) containing a 5- or 6-membered ring formed by the methine groups are as follows.

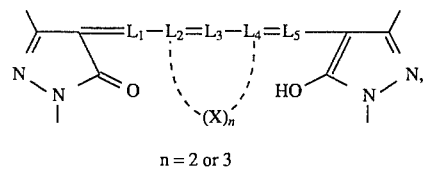

n = 2 or 3
X = a substituted or unsubstituted methine group

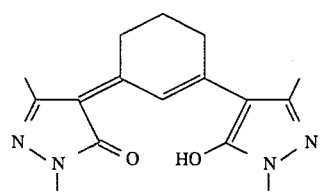

Examples of the monovalent cation represented by M include an alkaline metal ion such as a sodium ion and a potassium ion, an ammonium ion, a lower alkylammonium ion such as triethylammonium ion, and a pyridinium ion (including substituted pyridinium).

The suffixes m and n each represent an integer 0 or 1.

If the compound represented by formula (A) is molecularly dispersed in a photographic light-sensitive material, its molecular weight is preferably not more than 600, particularly not more than 500. If the molecular weight of the compound (A) is not less than 500, particularly not less than 600, at least one of $R_1$, $R_2$ and $R_3$ preferably has a water-soluble group. Particularly preferred examples of such a water-soluble group include a sulfo group, a carboxyl group, a hydroxyl group, a carbamoyl group, and an amino group.

If the compound represented by formula (A) is solid-dispersed in the photographic light-sensitive material, M is preferably a hydrogen atom. In this case, at least one of $R_1$, $R_2$ and $R_3$ preferably contains a dissociative group having a pKa value of from not less than 3 to not more than 13, more preferably from not less than 4 to not more than 12. Preferred examples of such a dissociative group include a carboxyl group, a phenolic hydroxyl group, a carbamoyl group, and a sulfamoyl group.

The compound represented by formula (A) can be synthesized by a reaction of a compound represented by formula (B) with various methine sources (e.g., ethyl orthoformate, 1,1,3,3-tetramethoxypropane, malonaldehydedianyl, glutaconaldehydedianyl).

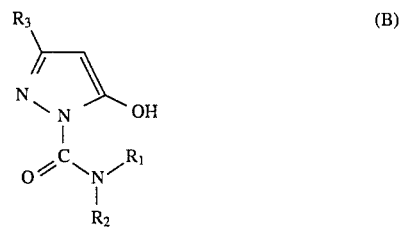

The compound represented by formula (B) can be synthesized by a reaction of hydroxypyrazole with a sodium cyanate or an isocyanate or the ring-closure condensation reaction of a semicarbazide derivative with a β-ketoacid ester, an oxaloacetic ester, a β-alkoxy-β-aminoacrylic ester, a β,β-dialkoxyacrylic ester or a β-alkoxy-β-carbonamideacrylic ester, as shown in the following reaction formula:

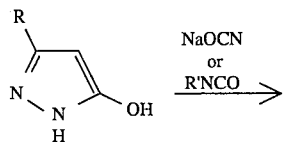

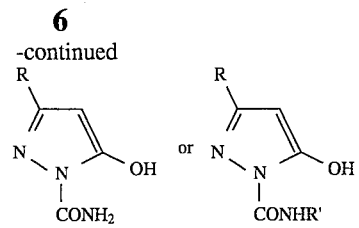

wherein R has the same meaning as $R_3$; and R' has the same meaning as $R_1$ and $R_2$.

For example, these reaction can be carried out according to *Khim. Geterotsiki. Soedin.*, 8, 1058 (1990), *Heterocyclic Fungicides I*, Vol. 52, p. 535 (1975), U.S. Pat. No. 2,472,581, or U.S. Pat. No. 2,439,098.

Specific examples of the pyrazole compound of the present invention will be given below (Tables 1 to 3).

TABLE 1

| Comp. No. | $R_1$ | $R_2$ | $R_3$ | $=L_1-(L_2=L_3)_m-(L_4=L_5)_n-$ | M |
|---|---|---|---|---|---|
| 1 | H | H | $CH_3$ | $=CH-$ | H |
| 2 | H | H | $n-C_4H_9$ | $=CH-$ | H |
| 3 | H | $n-C_3H_7$ | $CH_3$ | $=CH-$ | H |
| 4 | H | Ph | $CH_3$ | $=CH-$ | H |
| 5 | H | H | $-NHCOCH_3$ | $=CH-$ | K |
| 6 | H | $n-C_4H_9$ | $-COOC_2H_5$ | $=CH-$ | H |
| 7 | $CH_3$ | $CH_3$ | $-COOC_2H_5$ | $=CH-$ | H |
| 8 | H | $n-C_3H_7$ | Ph | $=CH-$ | H |
| 9 | H | H | $-COOH$ | $=CH-$ | H |
| 10 | H | H | ―⟨C₆H₄⟩―$SO_3H$ | $=CH-$ | H |

TABLE 2

| Comp. No. | $R_1$ | $R_2$ | $R_3$ | $=L_1-(L_2=L_3)_m-(L_4=L_5)_n-$ | M |
|---|---|---|---|---|---|
| 11 | H | H | $-C_2H_5$ | $=CH-CH=CH-$ | H |
| 12 | H | H | ―⟨C₆H₄⟩―COOH | $=CH-CH=CH-$ | H |
| 13 | H | H | $-COOH$ | $=CH-CH=CH-$ | H |

TABLE 2-continued

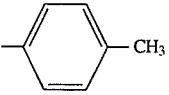

| Comp. No. | $R_1$ | $R_2$ | $R_3$ | $=L_1-(L_2=L_3)_m-(L_4=L_5)_n-$ | M |
|---|---|---|---|---|---|
| 14 | H | 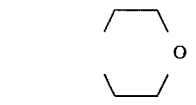 —CH₃ | —CH₃ | =CH—CH=CH— | H |
| 15 | 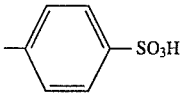 | | —CH₃ | =CH—CH=CH— | K |
| 16 | —CH₃ | —CH₃ | —COOC₂H₅ | =CH—CH=CH— | K |
| 17 | H | H | —NH₂ | =CH—CH=CH— | K |
| 18 | H | n-C₃H₇ | —OEt | =CH—CH=CH— | H |
| 19 | H | n-C₄H₉ | 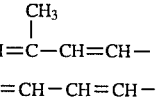 —SO₃H | =CH—CH=CH— | H |

TABLE 3

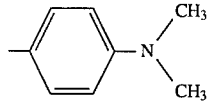

| Comp. No. | $R_1$ | $R_2$ | $R_3$ | $=L_1-(L_2=L_3)_m-(L_4=L_5)_n-$ | M |
|---|---|---|---|---|---|
| 20 | H | H | —C₄H₉ | =CH—CH=CH—CH=CH— | H |
| 21 | H | H | —NHCOC₅H₁₁(n) | =CH—CH=CH—CH=CH— | H |
| 22 | H | n-C₃H₇ | —Ph | =CH—CH=CH—CH=CH— | H |
| 23 | H | n-C₄H₉ | —NHCONHC₄H₉(n) | =CH—CH=CH—CH=CH— | H |
| 24 | H | H | —CH₃ | =CH—CH=C(CH₃)—CH=CH— | H |
| 25 | H | H | 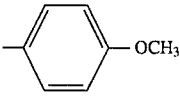 | =CH—CH=CH—CH=CH— | H |
| 26 | H | H | 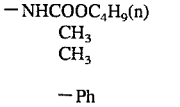 —OCH₃ | =CH—CH=CH—CH=CH— | H |
| 27 | H | —Ph | —NHCOOC₄H₉(n) | =CH—CH=CH—CH=CH— | K |
| 28 | H | —Ph | CH₃ | =CH—CH=CH—CH=CH— | H |
| 29 | H | n-C₃H₇ | CH₃ | =CH—CH=CH—CH=CH— | H |
| 30 | H | H | —Ph | =CH—CH=C(CH₃)—CH=CH— | H |

TABLE 3-continued

[Structure: pyrazolonoxonol compound with R_1, R_2, R_3 substituents and linker =L_1-(L_2=L_3)_m-(L_4=L_5)_n-]

| Comp. No. | $R_1$ | $R_2$ | $R_3$ | $=L_1-(L_2=L_3)_m-(L_4=L_5)_n-$ | M |
|---|---|---|---|---|---|
| 31 | H | H | $-NHCO-\!\langle\text{Ph}\rangle\!-COOH$ | $=CH-CH=CH-CH=CH-$ | H |
| 32 | H | $-\!\langle\text{Ph}\rangle\!-OCH_3$ | $-\!\langle\text{Ph}\rangle\!-SO_3H$ | $=CH-CH=CH-CH=CH-$ | H |

The compound of the present invention represented by formula (A) may be incorporated in either photosensitive layers or non-photosensitive layers, preferably in non-photosensitive layers.

The term "molecular dispersion" as used herein is meant to indicate that the compound represented by formula (A) is dispersed in an emulsion layer or other hydrophilic colloidal layers so uniformly that no solids can be observed even under an electron microscope (TEM) at 100,000 power.

In the solid dispersion according to the present invention, the average grain diameter of the microcrystalline grains of the compound of the present invention is in the range of not less than 0.01 μm to not more than 10 μm, preferably not less than 0.01 μm to not more than 2 μm, particularly not less than 0.01 μm to not more than 0.5 μm.

The compound of the present invention represented by formula (A) can be molecularly dispersed in the photographic layers or non-photosensitive layers by various methods. For example, the compound (A) may be dispersed in the photosensitive layers or non-photosensitive layers as it is. Alternatively, the compound (A) may be dispersed in the photosensitive layers or non-photosensitive layers in the form of solution in a proper solvent such as methyl alcohol, ethyl alcohol, propyl alcohol, halogenated alcohol as described in JP-A-48-9715 and U.S. Pat. No. 3,756,830, acetone, water, dimethylformamide, pyridine and mixture thereof. Preferred among these solvents are water, methanol, and mixture of water and methanol.

The compound of the present invention represented by formula (A) can be solid-dispersed in the photosensitive layers or non-photosensitive layers by various methods. For example, a method may be used which comprises dissolving the compound in a proper solvent, and then adding a poor solvent to the solution to deposit microcrystalline grains. An alternate method is to use a known grinding means such as ball mill, sand mill, colloid mill and jet mill. The solid dispersion may be carried out with the aid of a dispersing surface active agent as necessary.

Examples of the emulsion to be used in the silver halide photographic material of the present invention there may be used a commonly used silver halide such as silver chloride, silver bromide, silver bromochloride, silver bromoiodide and silver bromochloroiodide which has been spectrally sensitized with a cyanine dye, a melocyanine dye or the like.

The silver halide photographic material of the present invention may comprise a commonly used additive such as a surface active agent and a hardener incorporated therein. If applied to color photographic light-sensitive materials, the silver halide photographic material of the present invention may comprise coloring couplers and their dispersants incorporated therein.

The pyrazolonoxonol compound of the present invention is preferably used in an amount of 0.5 to 1,000 mg/m², more preferably 1 to 500 mg/m², further preferably 5 to 200 mg/m² of a layer in the silver halide photographic material, in either case when it is molecularly dispersed or solid-dispersed.

The present invention will be further described in the following examples.

EXAMPLE 1

Synthesis of 1-amide-3-butyl-5-hydroxypyrazole:
31.6 g of methylvaleryl acetate and 22.3 g of semicarbazide hydrochloride were mixed with 200 ml of methanol. The mixture was stirred at room temperature for 30 minutes. To the mixture was then added 50 g of a 28% methanol solution of sodium methoxide. The mixture was then stirred at room temperature for 2 hours. Methanol was then distilled off under reduced pressure. To the residue was then added 300 ml of water. The aqueous solution was then neutralized with concentrated hydrochloric acid. The resulting crystal was recovered by filtration, and then washed with water. (Yield: 25.2 g)

Synthesis of Compound 2:
5.0 g of 1-amido-3-butyl-5-hydroxypyrazole and 2.2 g of ethyl orthoformate were mixed with 20 ml of acetic acid. The mixture was then stirred at a temperature of 40° C. for 30 minutes. The mixture was then allowed to cool to room temperature. The resulting crystal was recovered by filtration, and then washed with methanol. (Yield: 3.6 g; λmax: 439 nm (DMF))

EXAMPLE 2

Synthesis of potassium salt of 1-dimethylcarbamoyl-3-ethoxycarbonyl- 5-hydroxypyrazole:
To 160 ml of water were added 23 ml of acetic acid, 41.2 g of 4,4-dimethylsemicarbazide and 84.1 g of sodium salt of ethyl oxaloacetate. The mixture was then stirred at room temperature for 2 hours. The resulting crystal A was recovered by filtration, and then washed with ethanol. To 165 ml of ethanol were then added 28.1 g of the crystal A and 14.2 g of potassium carbonate. The mixture was then refluxed with stirring for 2 hours. The solution was allowed to cool to room temperature, and then filtered through Celite. The filtrate was then distilled to remove ethanol therefrom. Thus, 14.9 g of an oily desired compound was obtained.

Synthesis of Compound 16:

4.5 g of potassium salt of 1-dimethylcarbamoyl-3-ethoxycarbonyl- 5-hydroxypyrazole and 2.3 g of malonaldehydedianyl hydrochloride were mixed with 40 ml of ethanol. To the mixture was then added 2.8 ml of triethylamine. The mixture was then stirred at a temperature of 60° C. for 4 hours. The mixture was then allowed to cool to room temperature. To the mixture was then added 2.0 g of potassium acetate. The mixture was then filtered. To the filtrate were then added 25 ml of isopropyl alcohol and 25 ml of ethyl acetate. The resulting crystal was then recovered by filtration. (Yield: 1.2 g; $\lambda$max: 543 nm ($H_2O$))

EXAMPLE 3

Synthesis of Compound 20:

10.0 g of 1-amido-3-butyl-5-hydroxypyrazole and 7.8 g of glutaconaldehydedianyl hydrochloride were mixed with 50 ml of dimethylformamide (DMF). To the mixture was then added 19.2 ml of triethylamine. The mixture was then stirred at temperature of 30° C. for 4 hours. The mixture was allowed to cool to room temperature, and then poured into a mixture of 25 ml of concentrated hydrochloric acid and 50 ml of methanol. The resulting crystal was recovered by filtration, and then washed with methanol. (Yield: 5.0 g; $\lambda$max: 610 nm (DMF))

EXAMPLE 4

Synthesis of 3-phenyl-1-n-propylcarbamoyl-5-hydroxypyrazole:

To 90 ml of acetonitrile were added 18.4 g of 3-phenyl-5-hydroxypyrazole and 9.8 g of n-propyl isocyanate. The mixture was then refluxed for 2 hours. After the completion of the reaction, acetonitrile was distilled off under reduced pressure. The resulting residue was then recrystallized from methanol. (Yield: 6 g)

Synthesis of Compound 22:

6.0 g of 3-phenyl-1-n-propylcarbamoyl-5-hydroxypyrazole and 2.9 g of glutaconaldehydedianyl hydrochloride were mixed with 30 ml of dimethylformamide (DMF). To the mixture was then added 8 ml of triethylamine. The mixture was then stirred at room temperature for 4 hours. After the completion of the reaction, the reaction mixture was poured into a mixture of 10 ml of concentrated hydrochloric acid and 20 ml of methanol. The resulting crystal was recovered by filtration, and then washed with methanol and water. (Yield: 4.5 g; $\lambda$max: 645 nm (DMF))

EXAMPLE 5

Synthesis of Compound 31:

The same procedure as for the synthesis of Compound 22 was repeated except for using 6.3 g of 1-amido-3-carboxybenzoylamino- 5-hydroxypyrazole for 3-phenyl-1-n-propylcarbamoyl- 5-hydroxypyrazole to obtain 4.0 g of Compound 31. ($\lambda$max: 645 nm (DMF))

EXAMPLE 6

Preparation of molecular dispersion of dye (dispersion process A):

These dyes were each dissolved in a 1% aqueous solution of sodium bicarbonate to prepare 1% aqueous dye solutions.

Preparation of solid dispersion of dye (dispersion process B)

The foregoing dyes were each dissolved in a minimum quantity of DMF. The solutions were each then added dropwise to a 1.7% aqueous solution of a dispersant in an amount of 7 times that of DMF with vigorous stirring. The resulting dispersions were each then diluted to adjust the dye concentration to 1%.

The dye dispersions were each then added to a 10% aqueous solution of gelatin so that the optical density thereof when coated to a thickness of 80 g/m² is 1.0. To the dispersion was then added a hardener in an amount of 2.6% based on the weight of gelatin. The dispersions were each applied to an undercoated polyester film base, and then dried at a temperature of 50° C. for 24 hours. The polyester film bases were each then cut into 10 cm×12 cm rectangular specimens.

Age stability test:

The specimens were each then allowed to stand at a temperature of 50° C. and a humidity of 80% for 5 days. Five such specimens were measured for density by means of a Macbeth transmission densitometer TD-504 before and after the test. The five measurements were then averaged to determine the density of each specimen. The results are set forth in Table 4.

Table 4 shows that the dyes of the present invention exhibit an excellent age stability.

TABLE 4

| Compound No. | Dispersion process | Before test | After test |
| --- | --- | --- | --- |
| 5 | A | 1.01 | 0.95 |
| 15 | A | 1.00 | 0.93 |
| 16 | A | 1.00 | 0.96 |
| 2 | B | 0.99 | 0.98 |
| 20 | B | 1.01 | 1.00 |
| 29 | B | 0.99 | 0.99 |
| Comparative dye 1 | A | 1.01 | 0.89 |
| Comparative dye 2 | A | 0.98 | 0.87* |
| Comparative dye 3 | B | 1.00 | 0.90* |
| Comparative dye 4 | A | 1.00 | 0.81 |
| None | — | 0.02 | 0.02 |

*A great tone change was observed

Dispersant

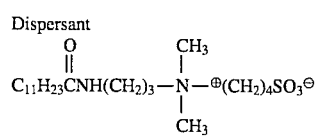

Hardener

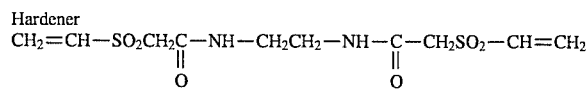

Comparative dye 1

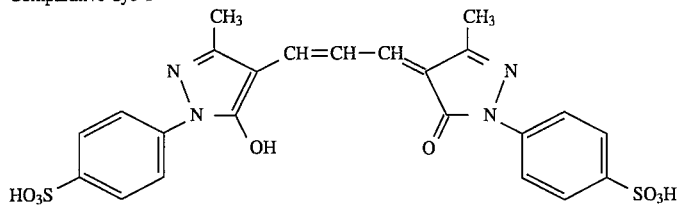

Comparative dye 2

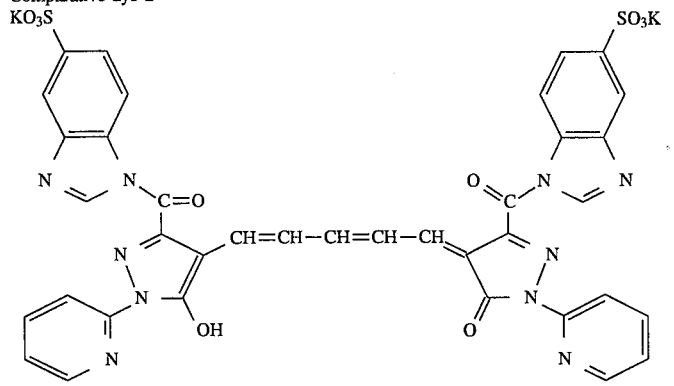

Comparative dye 3

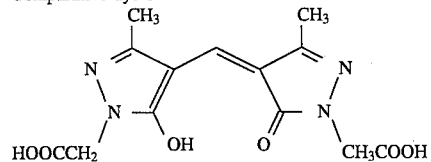

Comparative dye 4

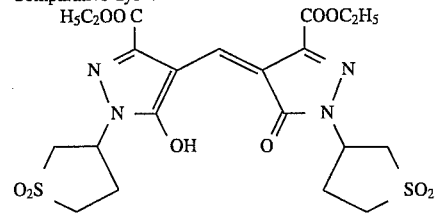

The novel pyrazolonoxonol compound of the present invention exhibits an excellent stability in gelatin as compared with dyes which have heretofore been known and thus can find a wide application in silver halide photographic materials requiring an excellent age stability.

While the invention has been described in detail and with reference to specific embodiments thereof, it will be apparent to one skilled in the art that various changes and modifications can be made therein without departing from the spirit and scope thereof.

What is claimed is:

1. A pyrazolonoxonol compound represented by formula

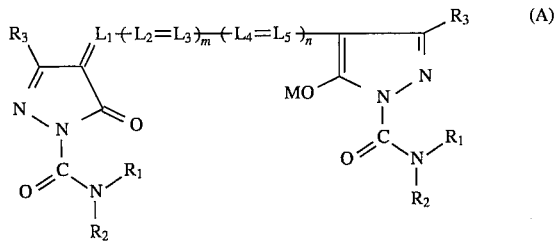

wherein $R_1$ and $R_2$ each represents a hydrogen atom, an alkyl group or an aryl group, and the alkyl groups represented by $R_1$ and $R_2$ may bond to each other to form a saturated 5- or 6-membered ring; $R_3$ represents a hydrogen atom, an alkyl group, an aryl group, a heterocyclic group, a hydroxyl group, an alkoxy group, a carboxyl group, an ester group, a carbamoyl group, an amino group, an acylamino group, an ureido group, an urethane group or a cyano group; $L_1$, $L_2$, $L_3$, $L_4$ and $L_5$ each represents a methine group, and the methine groups which are not adjacent to each other may bond to each other to form a 5- or 6-membered ring; M represents a hydrogen atom or a monovalent cation; and m and n each represent an integer 0 or 1.

2. The pyrazolonoxonol compound of claim 1, wherein $R_1$ and $R_2$ each represents a hydrogen atom, an alkyl group having 1 to 4 carbon atoms or a phenyl group.

3. The pyrazolonoxonol compound of claim 1, wherein $R_1$ and $R_2$ each represents a hydrogen atom.

4. The pyrazolonoxonol compound of claim 1, wherein $R_3$ represents an alkyl group having 1 to 4 carbon atoms, a phenyl group, an alkoxy group having 1 or 2 carbon atoms, a carboxyl group, an ester group having 2 or 3 carbon atoms, an amino group, an acylamino group having 2 or 3 carbon atoms, a ureido group having 1 to 5 carbon atoms or a urethane group having 2 to 5 carbon atoms.

5. The pyrazolonoxonol compound of claim 1, wherein $L_1$, $L_2$, $L_3$, $L_4$ and $L_5$ each represents an unsubstituted methine group or a methine group substituted by an alkyl group having 1 or 3 carbon atoms.

6. The pyrazolonoxonol compound of claim 1, wherein said pyrazolonoxonol compound is a molecularly dispersed pyrazolonoxonol compound.

7. The pyrazolonoxonol compound of claim 1, wherein said pyrazolonoxonol is a solid-dispersed pyrazolonoxonol compound.

* * * * *